(12) United States Patent
Gorin

(10) Patent No.: US 6,768,055 B1
(45) Date of Patent: Jul. 27, 2004

(54) CABLE ENTRY BOX

(76) Inventor: Thomas Michael Gorin, 2125 Virginia Pl. NE., Atlanta, GA (US) 30305

( * ) Notice: Subject to any disclaimer, the term of this patent is extended or adjusted under 35 U.S.C. 154(b) by 0 days.

(21) Appl. No.: 10/358,638

(22) Filed: Feb. 5, 2003

(51) Int. Cl.⁷ .................................................. H02G 3/08
(52) U.S. Cl. ......................... 174/50; 174/58; 220/4.02; 439/535
(58) Field of Search ............................. 174/50, 53, 66, 174/57, 58; 220/4.02, 241, 3.6, 3.8; 248/906; 439/535

(56) References Cited

U.S. PATENT DOCUMENTS

| | | | |
|---|---|---|---|
| 4,947,281 A | * | 8/1990 | Boteler .......................... 361/56 |
| 5,326,931 A | | 7/1994 | Cain et al. ..................... 174/48 |
| 6,288,334 B1 | | 9/2001 | Hennum ..................... 174/52.1 |
| 6,290,375 B1 | | 9/2001 | LeVasseur ................... 362/368 |
| 6,483,032 B2 | * | 11/2002 | Adams ......................... 174/66 |

* cited by examiner

*Primary Examiner*—Dhiru R Patel
(74) *Attorney, Agent, or Firm*—Thomas, Kayden, Horstemeyer & Risley

(57) ABSTRACT

An entry box (8) includes a mounting plate (10) that mounts against the wall (12) over an opening (28) in the wall, and a cover (20) which is releasably attached to the mounting plate. A phase splitter (26) is supported on the cover in a position to register in alignment with the mounting plate cable opening (14) when the cover is closed against the mounting plate. The ends of coaxial cables (32) are connected to the electrical fixture when the cover is opened from the mounting plate, and the adjacent end portions of the cables then are moved back through the mounting plate cable opening (14) and into the hollow wall when the cover is closed against the mounting plate.

17 Claims, 3 Drawing Sheets

CABLE ENTRY BOX

FIELD OF THE INVENTION

This invention involves an entry box for structured wiring installations in residential building structures such as a home or apartment, particularly an entry box for connecting communication cables. Telephone and video cables from outside a building structure are led to the entry box, and cables that service telephones, computers, faxes and other communication facilities within the building structure are connected to the entry cable in the box.

BACKGROUND OF THE INVENTION

With the development of new communication equipment, such as computers, fax machines, security systems, satellite and cable TV, internet, and telephone answering systems that are connected to communication cable, there has been an increase in the need for running more interior cable within a typical building structure. The typical wiring arrangement in new building structures is to run the interior communication cables from each plug location that will serve the communication equipment through the hollow walls of the building structure to a central connection point in the building structure. This usually is done by a telephone technician when the building is partially constructed. The cables typically include coaxial cables and telephone cables, and more cables extend to the central connection point.

When the construction of the building is substantially completed and the interior cables are to be activated, the technician installs a box, usually known as an "entry box," at the central connection point, and the wires of the cable from outside the building are connected to the ends of the wires of the interior cables in the entry box. One service entry cable usually can serve several interior cables. In most cases, a phase splitter is to be positioned in the entry box interposed between the service entry cable and the interior cable leading to the communication equipment in the building structure so that the equipment can be operated simultaneously from one service entry cable.

The installation procedures used to install the service entry box in the typical hollow wall structure usually requires that a large hole be cut through a gypsum board or other wall board between the vertical studs in the wall at the central connection point. The hole is sized to fit the shape of the entry box that is to be installed. The entry box telescopes through the hole and its inside portion moves into the interior space of the hollow wall, and the end portions of the various cables are pulled from within the interior of the hollow wall into the entry box. A phase splitter and possibly other electrical connectors and modules typically will be attached to the entry box before the entry box is to be installed in the wall. Most of the cables that are to be connected to the a phase splitter or other modules within the entry box are bent at their end portions so that the ends of the cables can reach the connectors of the modules.

The bending of the end portions of the cables usually requires a substantial length of each cable end to be present in the entry box, taking up room in the box. In some cases the bending of the end portions of cables deteriorates the cables. Also, it is usually difficult for the installer to find room in the entry box for his hands, his tools, and for the multiple numbers of cables, particularly when the installer is bending the end portions of the cables to mate with the connectors. Once the connections of the cables have been made to the modules within the entry box, a cover is applied to it, closing the box about the cable ends, the phase splitter and any other modules in the box.

By placing the entry box into the hollow wall structure, the box occupies the hollow space in the wall and, therefore, the protrusion of the box from the wall can be minimized. However, this usually means that the cables that are to be fed to the box must be bent at their end portions so as to first enter the box and bent again after inside the box to conform to the connection of its module within the box. The bending of the cables, the threading of the cables into the box, and then the second bending of the cables and the making of the connection to the modules in the box is an arduous task for the installer.

It is to these problems that this invention is directed.

SUMMARY OF THE INVENTION

Briefly described, the present invention comprises an entry box, particularly for use for the entry of communication cable into a building structure. The invention effectively uses the hollow space within the typical hollow wall of a building structure at the position of an entry box to accommodate the end portions of the cables that are to be connected in the entry box.

When the entry box is to be installed, a hole in the wall board of the hollow wall will have been cut and the ends of the cables that are to be connected will have been drawn from the hollow wall through its hole.

The entry box includes a mounting plate and a cover. The mounting plate has one or more openings therein that register with the opening in the hollow wall. One of the mounting plate openings is a mounting plate cable opening for receiving the end portions of coaxial cables. The installer typically extends the free ends of the coaxial cables from the wall opening through the mounting plate cable opening and applies the mounting plate flush against the wall with the mounting plate cable opening registering with the wall opening.

The cover and the mounting plate are configured so as to form a receptacle there between, and a phase splitter and possibly other fixtures are supported on the interior surface of the cover. The phase splitter is mounted at a position on the cover so that when the cover is mounted to the mounting plate it is aligned with or "registers" with the mounting plate cable opening and with the opening in the wall board.

The installer usually connects the ends of the coaxial cables to the phase splitter when the cover is not mounted to the mounting plate but the phase splitter is within reach of the cables. Once the cables have been properly connected to the phase splitter and other wires are connected to their connections in the entry box, the cover is moved toward the mounting plate and attached to the mounting plate, thereby enclosing the cable ends and phase splitter within the entry box.

A feature of the invention is that as the cover is advanced toward the mounting plate with the cable ends connected to the phase splitter, etc., at least some of the end portions of the cables that have been extended through the opening in the mounting plate to the cover are moved back through the mounting plate cable opening and into the hollow interior of the wall. This results in at least some of the end portions of the cables not remaining in the receptacle formed by the mounting plate and cover and the space in the hollow wall behind the entry box is used for accommodating the end portions of the cables.

Another feature of the invention is that the phase splitter will have its connectors oriented toward a facing relationship with respect to the opening in the mounting plate, so that the end portions of the cables that extend through the opening in the wall do not have to be bent inside the entry box to make a connection to the phase splitter, etc. The ends of the cables that are connected to the phase splitter extend approximately rectilinearly from the phase splitter so that they extend back through the mounting plate cable opening and into the hollow wall. Therefore, a minimal length of the cables extend into the confines of the closed entry box, and the cables have a minimum number of bends at their end portions.

The mounting plate cable opening can be of a breadth, both width and height, to receive the cable ends in a pattern as required by the connectors of the phase splitter. In some instances, where it is desirable for the phase splitter to project from the cover through the mounting plate and into the wall opening, the cable opening of the mounting plate can be of a breadth larger than the phase splitter or other electrical fixture so as to telescopically receive a portion of the phase splitter, etc.

In addition to the cable connection features described above, the entry box can include other connections for cable, wires, etc. for low voltage equipment. A connector strip can be mounted to the mounting plate for receiving and connecting together the ends of wires of telephone cable. In order to facilitate convenient separation of the cables leading to the phase splitter and the cables leading to the connectors, a second mounting plate opening can be formed in the mounting plate, and the connectors are mounted to the mounting plate directly adjacent the second mounting plate opening.

The invention utilizes the cover as the support for the phase splitter. This has an advantage in a situation where the entry box is to be positioned in a difficult location within the building structure. The cover can be moved away from the mounting plate and the cable ends connected to the phase splitter mounted to it, and then the cover can be mounted to the mounting plate. This usually provides the installer with more room and more access to the phase splitter. Moreover, there is little bending of the cable ends during the installing procedures, since the cables come directly out of the wall to the phase splitter. This also has an advantage of reducing the amount of space in the enclosure that would be required by bending the ends of the cable. Accordingly, the entire box structure can be smaller than the prior art box structures to achieve a similar purpose.

Accordingly, it is an object of this invention to provide an improved entry box for mounting to a hollow wall, with at least one electrical fixture mounted to a cover of the box and projecting within the box toward the hollow wall structure of the building.

Another object of this invention is to provide an improved entry box that reduces the amount of cable required in the box for connecting to the fixtures within the box.

Another object of this invention is to provide an improved entry box for low voltage cable, wherein a phase splitter is mounted to a cover of the entry box and the end portions of coaxial cables are connected to the phase splitter and project directly from the phase splitter into the hollow wall.

Another object of the invention is to provide an improved electrical entry box that stores the end portions of cables in the hollow portion of the wall to which the entry box is mounted.

Another object of this invention is to provide an improved method of connecting the ends of electrical cables extending through hollow walls of a building structure, by mounting a mounting plate of the box about a hole in the wall, drawing the cable ends through a hole in the mounting plate to the cover of the box, connecting the ends of the cables to a fixture supported in the cover of the box, and then moving the ends of the cables back through the hole in the wall as the cover is mounted to the mounting plate.

Other objects, features and advantages of the present invention will become apparent upon reading the following specification, when taken in conjunction with the accompanying drawings.

DETAILED DESCRIPTION

Figure 1:
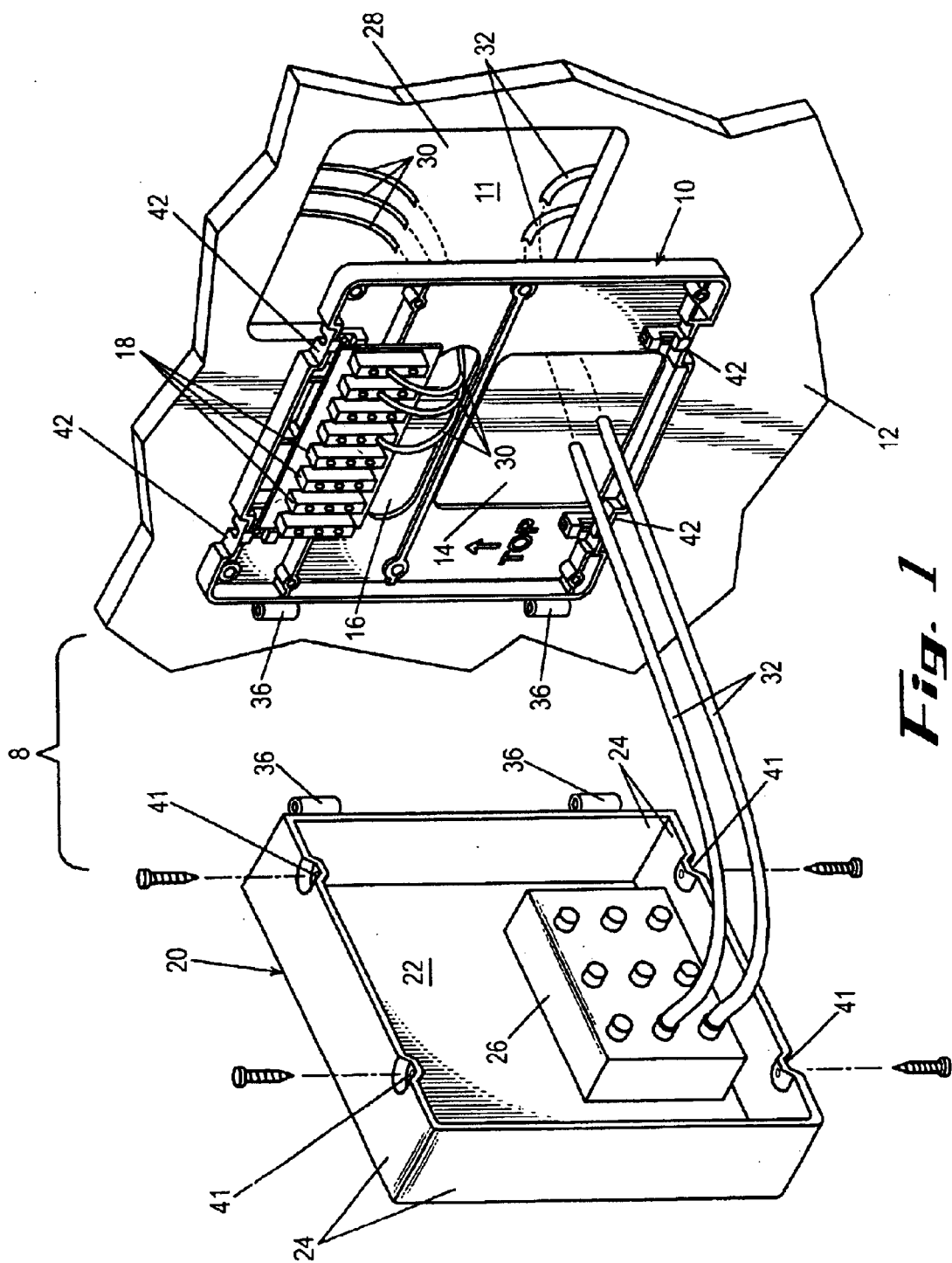
FIG. 1 is an expanded perspective illustration of the entry box.
Figure 2:
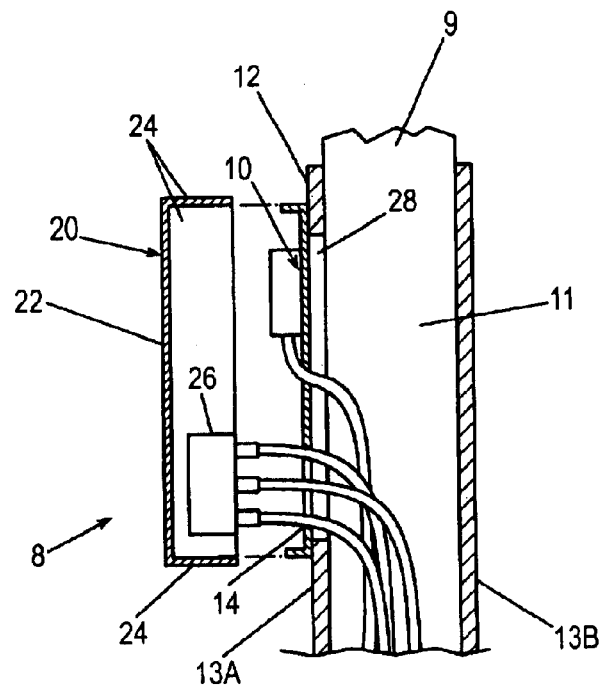
FIG. 2 is a side elevational view of the entry box, showing the cover displaced from the mounting plate.
Figure 3:
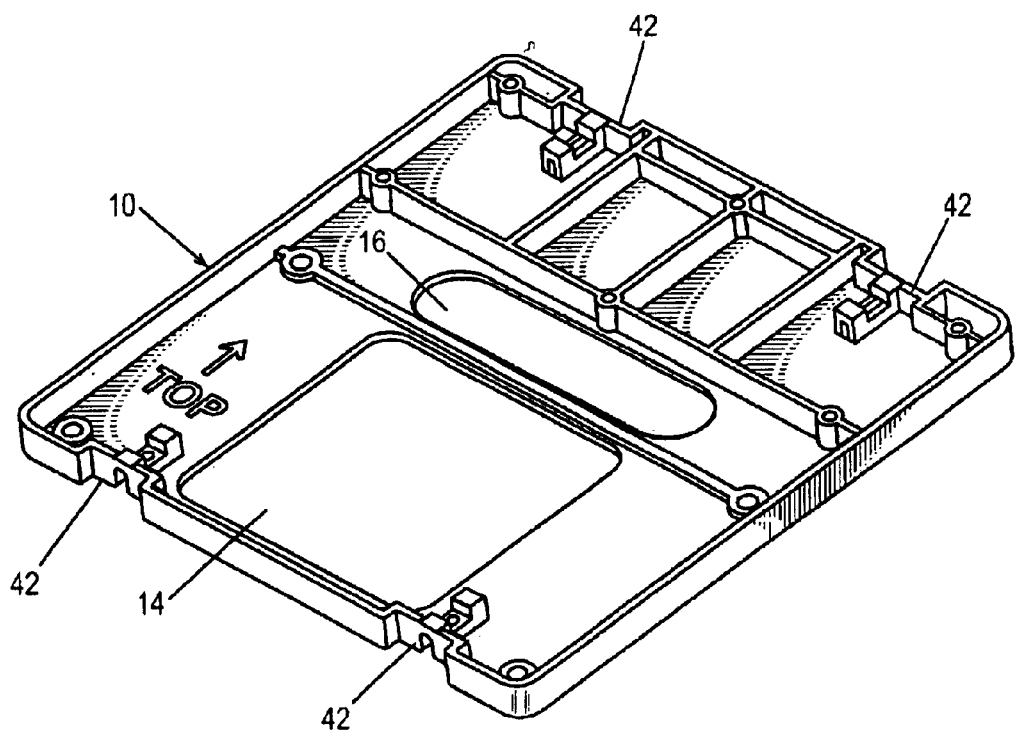
FIG. 3 is a perspective view of the inside of the mounting plate.

Referring now in more detail to the drawings, in which like numerals indicate like parts throughout the several views, FIGS. 1 and 2 show the entry box 8 that includes the mounting plate 10 and cover 20. The mounting plate 10 is mounted to the wall 12 of a building structure, with the wall usually being formed of spaced panels of wall board 13A and 13B supported in spaced parallel relationship by parallel vertical studs 9. This forms a cavity 11 between the boards 13A and 13B.

The mounting plate can include two openings, mounting plate cable opening 14 and second mounting plate opening 16. A plurality of electrical connectors 18 can be mounted to the mounting plate 10 adjacent the second mounting plate opening 16.

Figure 4:
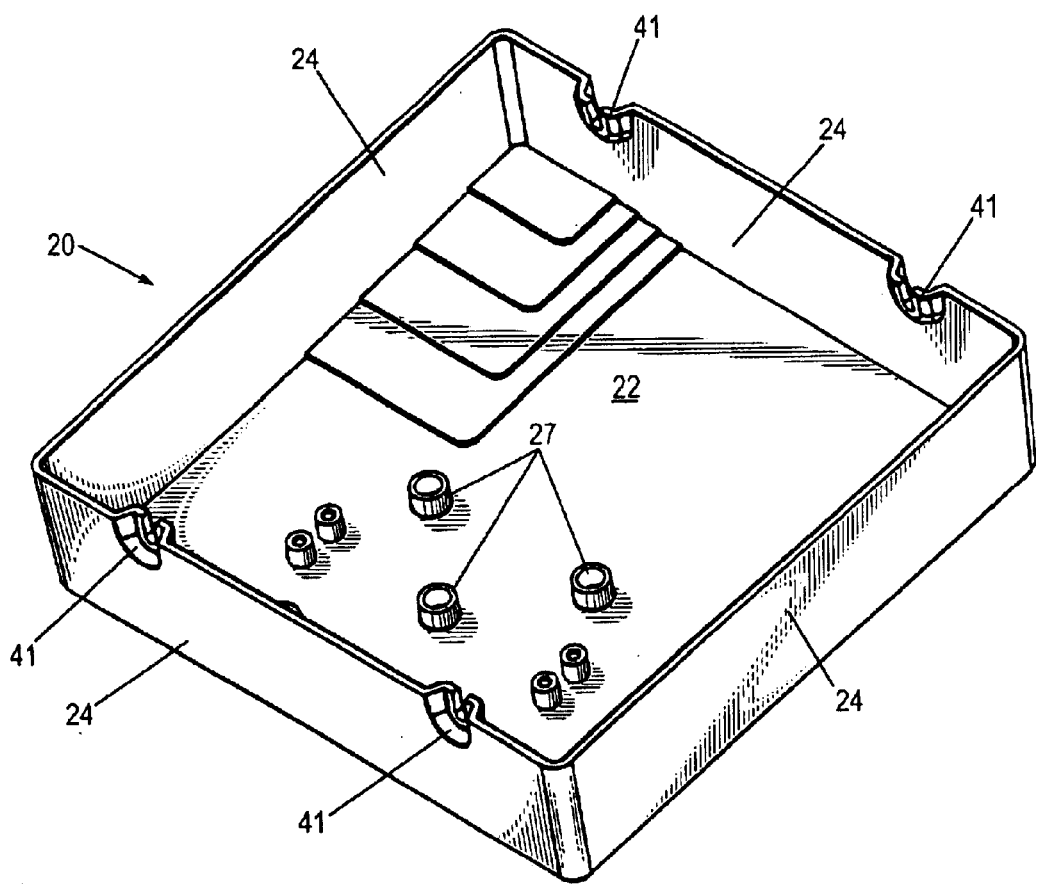
FIG. 4 is a perspective view of the inside of the cover.

Cover 20 includes front or external wall 22 and perimeter walls 24 extending from the edges of the front wall. Phase splitter 26 is mounted to the front wall 22 inside the cover 20. As shown in FIG. 4, electrical fixture supports 27 are formed on the interior surface of the front wall of the cover 20 for mounting the phase splitter 26 to the cover. Phase splitter 26 is of a size slightly smaller in breadth than the lower, larger cable entry opening 14 in the mounting plate 10.

When the entry box is to be installed, the end of the wires and cables 30 and 32 will have been pulled through the pre-cut opening 28 in the wall board 12. The mounting plate is moved toward the wall and the ends of the wires and cables are pulled through the mounting plate cable opening 14 and the second mounting plate opening 16 of the mounting plate. The coaxial cables are extended through the mounting plate cable opening 14 and the telephone cable is extended through the second mounting plate opening 16. The mounting plate 10 is then applied to the wall and attached to it with conventional fasteners. The low voltage cables 30 and 32 will extend through the respective openings 16 and 14 of the mounting plate. The cables 30 typically are telephone cables and are connected to one of the connectors 18. The other cables 32 that extend through the mounting plate cable opening 14 are coaxial cables and are connected to the phase splitter 26 on the cover 20. During this cable connection process, the cover 20 usually remains removed from the mounting plate 10, so as to fully expose all of the connectors 18 on the mounting plate. Since the mounting plate is substantially flat, there should be no interference to the hands of the installer by obstructions of the box.

The coaxial cables 32 can be pulled farther through the mounting plate cable opening 14 and are attached to the phase splitter 26. Since the connectors 34 of the phase splitter 26 extend away from the interior of the cover 20, they are readily accessible for connection to the cables 32, without encumbrance to the installer.

Once the ends of the cables 30 and 32 have been properly connected to the phase splitter 26 and connectors 18, the installer then mounts the cover 20 against the mounting plate 10. During this motion, of moving the cover toward the mounting plate, the coaxial cables 32 tend to move back through the mounting plate cable opening 14 so that the cavity 11 in the wall between the wall boards 13A and 13B behind the pre-cut opening 28 becomes usable as storage space for the end portions of cables 32.

Since the mounting plate cable opening 14 of the mounting plate 10 is slightly larger than the width and height dimensions of the phase splitter 26, and since the phase splitter is aligned with the mounting plate cable opening 14, the phase splitter will register with the cable opening 14, and the connectors and the end portions of the cables 32 will protrude through the cable opening 14 of the mounting plate back into the cavity of the wall structure.

It will be noted that there are only a few, if any, bends required in the cables 30 and 32 in order to make the connections described herein.

The mounting plate 10 is illustrated as being substantially flat. It has a small perimeter flange for strength and for connection to the wall and cover. It can be mounted flush against the flat wall surface. This provides working space about the electrical connector 18 for the installer and leaves the cavity 11 between the wall boards for storage of the end portions of the cables. The perimeter walls 24 of the cover 20 function as stand off walls and provide the stand off of the front wall 22 of the cover from the mounting plate 10 to accommodate the phase splitter 26 and connectors 18. However, the dimensions and proportions of the entry box 8 can be modified to achieve similar results, of the phase splitter 26 or other electrical fixture being mounted to the cover 20 and the cables being movable back through the mounting plate cable opening 14 when the cover and phase splitter, etc. are moved toward their mounted position on the mounting plate.

In the embodiment illustrated, the cover is slightly larger than the mounting plate and telescopes about the mounting plate, thereby forming an accurate alignment of the phase splitter 26 and the mounting plate cable opening 14. Other alignment means for aligning the cover on the mounting plate can be employed, if desired. For example, a hinge connection 36 can be established between the cover and the mounting plate or telescoping screw connectors 41, 42 can be formed in the cover and mounting plate.

Although preferred embodiments of the invention have been disclosed in detail herein, it will be obvious to those skilled in the art that variations and modifications of the disclosed embodiments can be made without departing from the spirit and scope of the invention as set forth in the following claims.

I claim:

1. An entry box for mounting to a hollow wall, the wall including an outside wall surface and a wall opening for extending electrical cables from within the hollow wall through the wall opening to the outside of the wall, said entry box comprising:

a mounting plate for mounting substantially flush to the outside wall surface over the wall opening, said mounting plate defining a mounting plate cable opening for registration with the wall opening, a cover releasably mounted to said mounting plate for closing said cover against said mounting plate and supporting said cover in spaced relationship with respect to said mounting plate and in a predetermined position with respect to said mounting plate, with a receptacle formed between said mounting plate and said cover, an electrical fixture supported on said cover in said receptacle, said electrical fixture located on said cover in said receptacle in a position to register in alignment with said mounting plate cable opening and the wall opening in response to said cover being closed against said mounting plate in said predetermined position, so that the ends of the electrical cables are extended from within the hollow wall and through the wall opening and the mounting plate cable opening and are connected to the electrical fixture when the cover is opened from the mounting plate, and the electrical cables connected to the electrical fixture are moved back through the mounting plate cable opening and the wall opening and into the hollow wall in response to the cover being closed against the mounting plate.

2. The entry box of claim 1, and further including a hinge connecting said cover to said mounting plate, so that the cover can be hingedly opened from said mounting plate for connection of electrical cables to the electrical fixture.

3. The entry box of claim 1, wherein said cover includes an external wall, and said electrical fixture is supported by said external wall of said cover such that the electrical fixture remains supported by said external wall when the cover is opened from the mounting plate.

4. The entry box of claim 1, wherein said electrical fixture is a phase splitter and said cables are coaxial cables.

5. The entry box of claim 1, wherein said mounting plate opening is of larger breadth than the breadth of said electrical fixture so that electrical fixture can telescopically protrude into said mounting plate cable opening in response to said cover being closed with respect to said mounting plate.

6. An entry box for mounting to a hollow wall, the wall having a wall opening therein for extending electrical cables from within the hollow wall through the wall opening to the outside of the wall, comprising:

a mounting plate for mounting substantially flush to the wall over the opening in the wall, said mounting plate defining a mounting plate cable opening for registration with the wall opening, a cover sized and shaped to engage said mounting plate for closing said cover against said mounting plate and supporting said cover in spaced relationship with respect to said mounting plate and in a predetermined position with respect to said mounting plate, with a receptacle formed between said mounting plate and said cover, an electrical fixture supported on said cover in said receptacle, said electrical fixture located on said cover in said receptacle in a position to register in alignment with said mounting plate cable opening and the wall opening when said cover is closed against said mounting plate in said predetermined position, so that the ends of the electrical cables are extended from within the hollow wall and through the wall opening and the mounting plate cable opening and are connected to the electrical fixture when the cover is opened from the mounting plate, and the electrical cables connected to the electrical fixture arm moved back through the mounting plate cable opening and the wall opening and into the hollow wall when the cover is closed against the mounting plate, a second mounting plate opening, and further including:

electrical connectors mounted on said mounting plate for connecting wires extending through said second mounting plate opening, said electrical connectors being sized and positioned for being enclosed in said receptacle of said cover when said cover is closed against said mounting plate.

7. An entry box for mounting to a hollow wall, the wall including an outside wall surface and a wall opening for extending coaxial cables from within the hollow wall through the wall opening to the outside of the wall, said entry box comprising:

a mounting plate for mounting to the outside wall surface about the wall opening, said mounting plate defining a mounting plate cable opening for registering with the wall opening, a cover releasably mounted to said mounting plate, an electrical fixture support carried by said cover, said electrical fixture support arranged to support an electrical fixture on said cover and in registration with said mounting plate cable opening when said cover is mounted to said mounting plate, the cover being configured such that when the cover is opened away from the mounting plate, the electrical fixture is supported on the cover and moves with the cover away from the cable opening of the mounting plate, the coaxial cables extending from within the hollow wall and extended through the mounting plate cable opening and connected to the electrical fixture move with the electrical fixture, and when the cover is closed against the mounting plate the cables extending from the electrical fixture move in response to the movement of the electrical fixture directly through the mounting plate cable opening into the hollow wall.

8. The entry box of claim 7, wherein said electrical fixture comprises:

a phase splitter configured to receive the ends of coaxial cables extending through the mounting plate cable opening in an orientation approximately normal to the wall on which said mounting plate is mounted.

9. The entry box of claim 7, wherein said electrical fixture is of smaller breadth than the breadth of said mounting plate cable opening, such that the electrical fixture can be telescopically received in the mounting plate cable opening.

10. The entry box of claim 7, wherein at least one of said mounting plate and said cover includes stand off walls for displacing said external wall of said cover from said mounting plate and forming a receptacle between said cover and said mounting plate for receiving the electrical fixture.

11. An entry box for mounting to a hollow wall, the wall having an opening therein for extending coaxial cables from within the hollow wall through the wall opening to the outside of the wall, said entry box comprising:

a mounting plate for mounting to the wall about the opening in the wall, said mounting plate defining a mounting plate cable opening for registering with the wall opening, a cover for mounting to said mounting plate, an electrical fixture support carried by said cover, said electrical fixture support arranged to support a phase splitter on said cover and in registration with said mounting plate cable opening when said cover is mounted to said mounting plate, so that the cover is opened away from the mounting plate, a phase splitter is supported on We cover, coaxial cables extending from within the hollow wall extended through the mounting plate cable opening and connected to the phase splitter, and the cover is closed against the mounting plate with the cables extending from the phase splitter directly through the mounting plate cable opening, a second mounting plate opening for registration with the wall opening, electrical connectors supported on said mounting plate at the side of said second mounting plate opening remote from said mounting plate cable opening for connecting telephone cable extending from within the hollow wall through said second mounting plate opening, said electrical connectors being sized and positioned for being enclosed in said entry box when said cover is closed against said mounting plate.

12. An entry box for mounting to a hollow wall, the wall having a wall opening therein for extending coaxial cable from within the hollow wall through the wall opening, said entry box comprising:

a mounting plate for mounting to the wall over the wall opening, said mounting plate defining a mounting plate cable opening for registration with the wall opening, a cover releasably mounted to said mounting plate, and an electrical fixture supported by said cover in alignment with said mounting plate cable opening and movable toward and away from said mounting plate cable opening in response to the cover moving toward or away from said mounting plate, whereby end portions of coaxial cables extending from within said hollow wall can be extend through the mounting plate cable opening directly to the electrical fixture and can be connected to the electrical fixture substantially without bending the portion of the cable extending from the mounting plate opening to the electrical fixture.

13. The entry box of claim 12, wherein said mounting plate cable opening is of greater breadth than the breadth of said fixture, such that the fixture is telescopically movable into the mounting plate cable opening in response to the cover moving toward the mounting plate.

14. The entry box of claim 12, wherein said electrical fixture is a phase splitter.

15. An entry box for mounting to a hollow wall, the wall having a wall opening therein for extending coaxial cable from within the hollow wall through the wall opening, comprising:

a mounting plate for mounting to the wall over the wail opening, said mounting plate defining a mounting plate cable opening for registration with the wall opening, a cover releasably mounted to said mounting plate, and an electrical fixture supported by said cover in alignment with said mounting plate cable opening, whereby end portions of coaxial cables extending from within said hollow wall can be extend through the mounting plate cable opening directly to the electrical fixture and can be connected to the electrical fixture substantially without bending the portion of the cable extending from the mounting plate opening to the electrical fixture, a second opening defined by said mounting plate, and electrical connectors supported on said mounting plate, whereby telephone cable can extend from the hollow wall through the second mounting plate opening and connect to said electrical connectors.

16. The entry box of claim 15, and further including:

said second mounting plate opening positioned for registration with the wall opening.

17. A process of connecting the ends of electrical cables extending through hollow walls of a building structure comprising:

forming an opening in the wall, providing an entry box having a mounting plate defining a mounting plate cable opening and having a cover relasably mounted to the mounting plate about the mounting plate cable opening, mounting an electrical fixture on the cover in registration with the mounting plate cable opening, mounting the mounting plate of the box on the outside surface of the wall with the mounting plate cable opening registering with the wall opening, extending the ends of electrical cables through the wall opening and through the mounting plate cable opening, connecting the ends of the cables to the electrical fixture mounted on the cover of the box, closing the cover of the box against the mounting plate of the box, as the cover is closed against the mounting plate, moving the electrical fixture in registration with the mounting plate cable opening and moving the cables back through the mounting plate cable opening and the wall opening.

\* \* \* \* \*